J. HYDE, DEC'D.
C. HYDE, ADMINISTRATRIX.
FUEL APPARATUS.
APPLICATION FILED SEPT. 30, 1911. RENEWED JAN. 29, 1914.
1,090,104.
Patented Mar. 10, 1914.
3 SHEETS—SHEET 2.
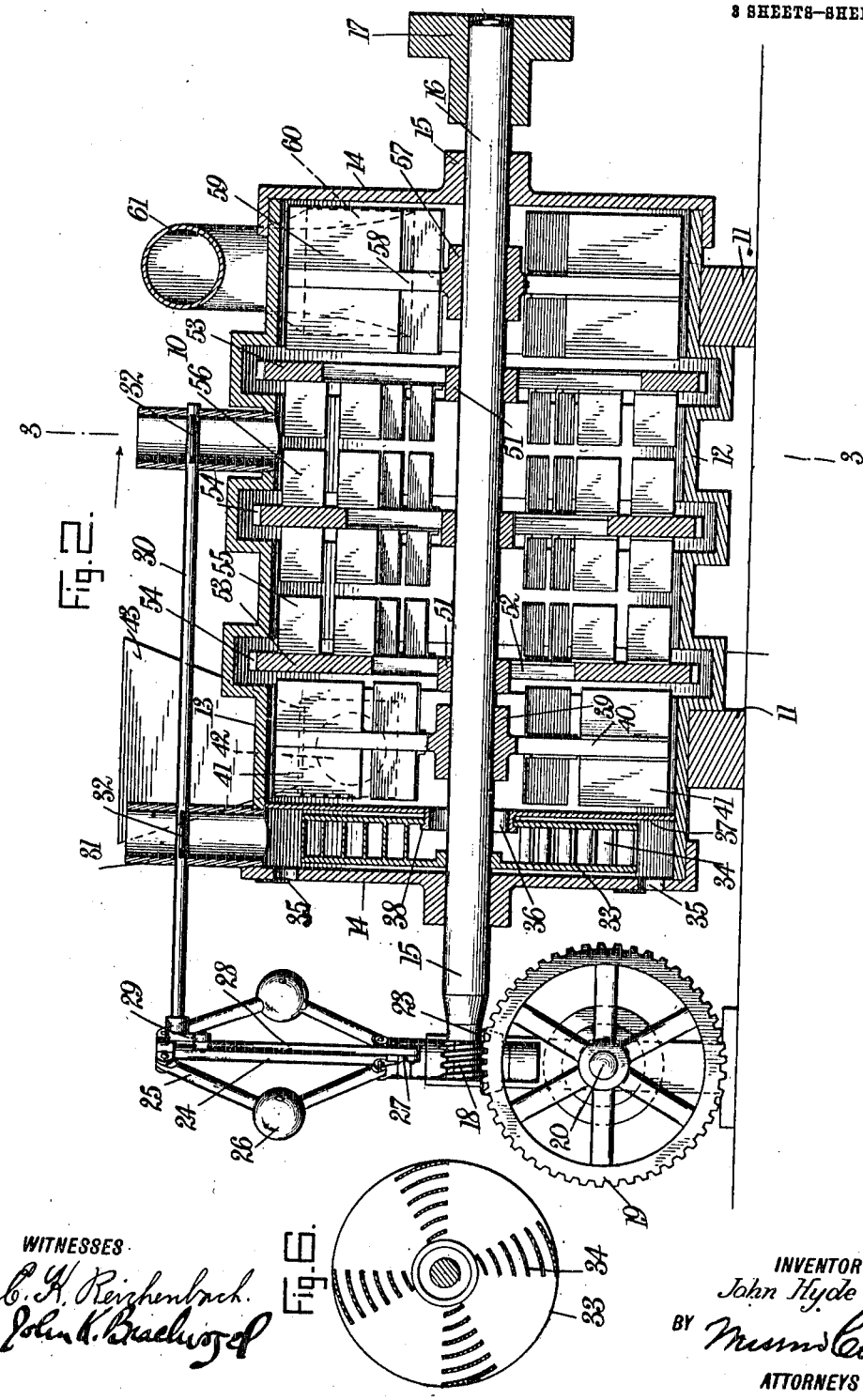
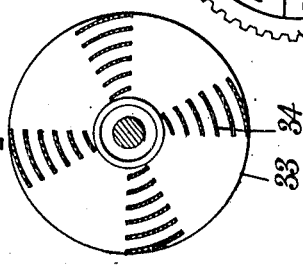
WITNESSES
INVENTOR
John Hyde
BY
ATTORNEYS J. HYDE, DEC'D.
C. HYDE, ADMINISTRATRIX.
FUEL APPARATUS.
APPLICATION FILED SEPT. 30, 1911. RENEWED JAN. 29, 1914.
1,090,104.
Patented Mar. 10, 1914.
3 SHEETS—SHEET 3.
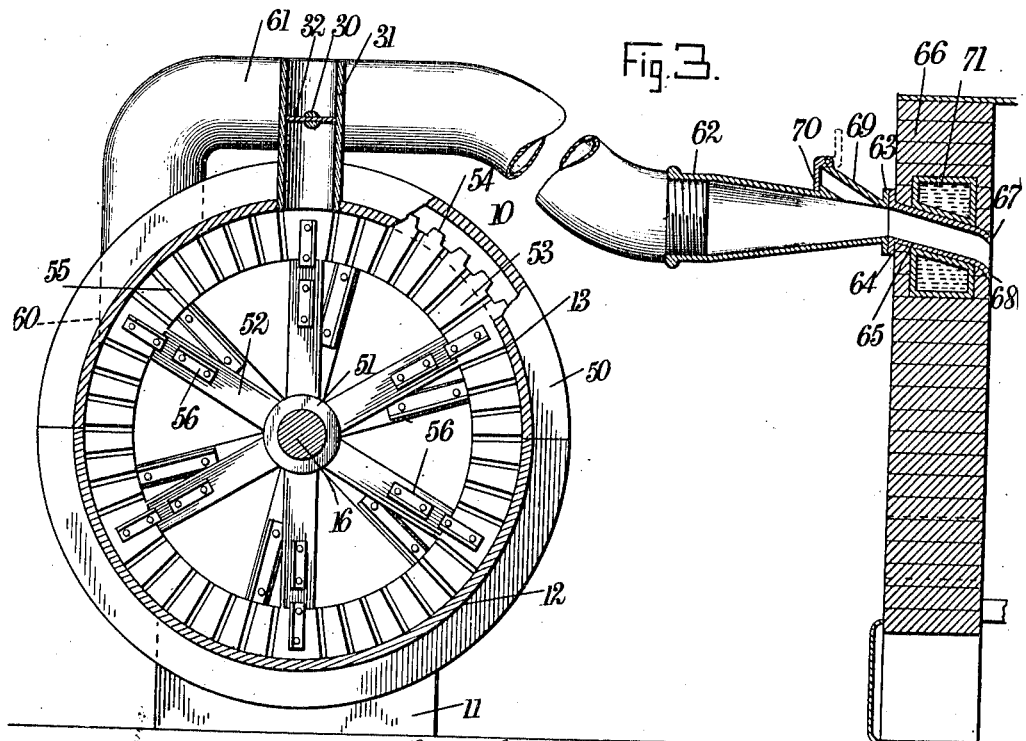
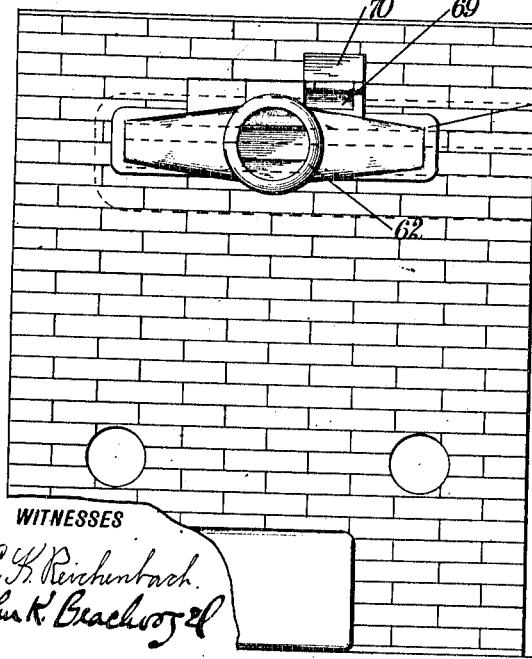
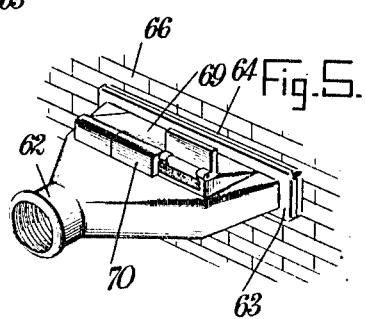
WITNESSES
INVENTOR
John Hyde
BY
ATTORNEYS

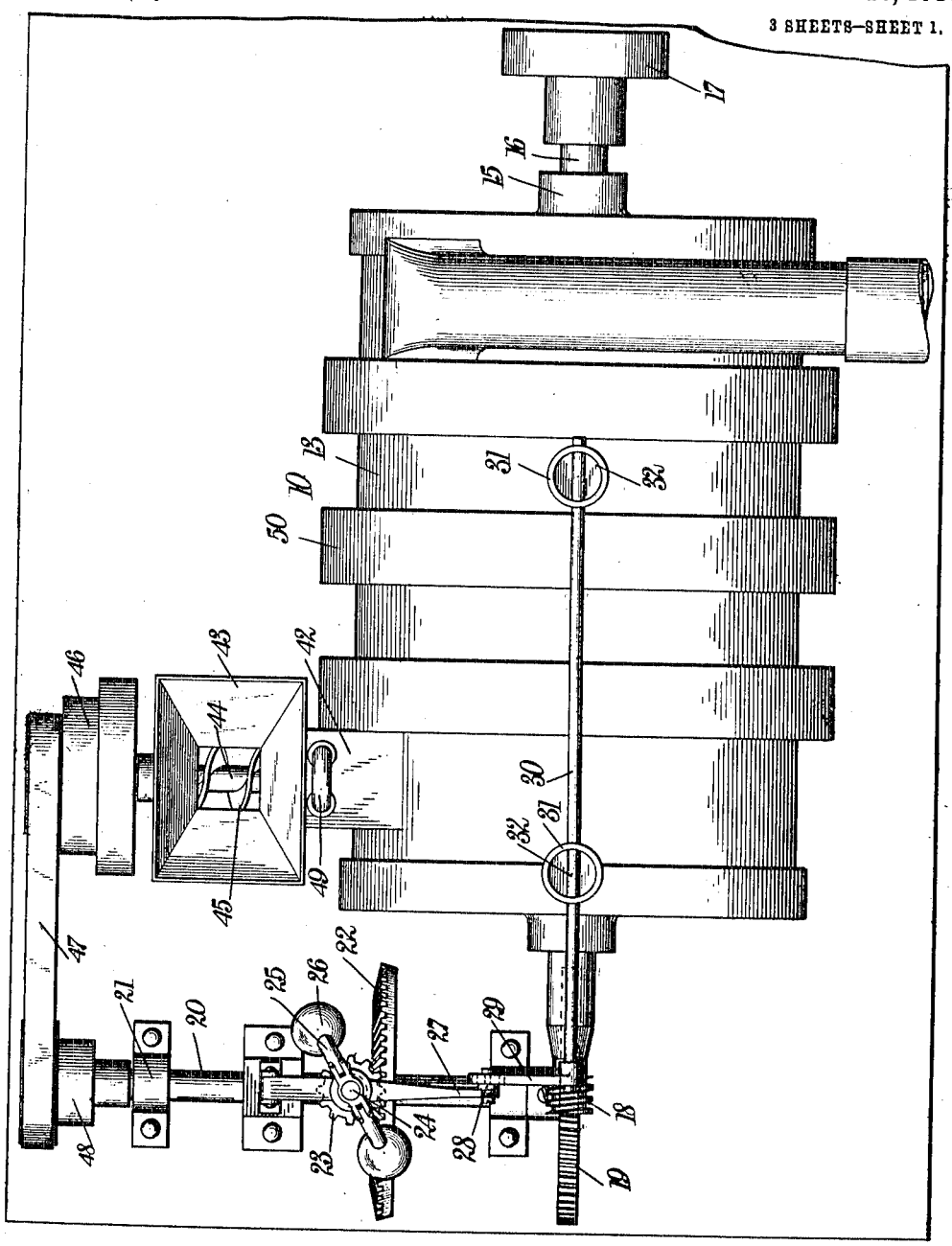

UNITED STATES PATENT OFFICE.

JOHN HYDE, OF PITTSBURGH, PENNSYLVANIA; CATHERINE HYDE, ADMINISTRATRIX OF SAID JOHN HYDE, DECEASED.

FUEL APPARATUS.

1,090,104. Specification of Letters Patent. Patented Mar. 10, 1914.

Application filed September 30, 1911, Serial No. 652,052. Renewed January 29, 1914. Serial No. 815,286.

*To all whom it may concern:*

Be it known that I, JOHN HYDE, a citizen of the United States, and a resident of Pittsburgh, in the county of Allegheny and State of Pennsylvania, have invented a new and Improved Fuel Apparatus, of which the following is a full, clear, and exact description.

This invention relates to apparatus for adapting coal and other like fuel for efficient combustion in a finely divided state admixed with air, and has reference more particularly to apparatus of the class described, which comprises a casing having a fuel inlet and an outlet, a rotary comminuting device in the casing, and a blower for drawing air through the comminuting device in the casing, and forcing the fuel mixture through the outlet.

An object of the invention is to provide a simple and efficient apparatus of the class described by means of which coal and like fuel can be rapidly and easily comminuted and thoroughly mixed with air for combustion under boilers, or for other purposes, by means of which the admixture of the finely divided fuel and air is a perfect one, which requires comparatively little power to drive it, in which the amount of air used for the fuel mixture is automatically regulated, which will not readily wear out, and in which the parts are easily accessible for purposes of repair and replacement.

Another object of the invention is to provide a nozzle for directing a fuel mixture of the kind referred to, into a furnace or other device in which the fuel is to be utilized, by means of which a thorough combustion of the fuel mixture is assured, in which the amount of air entering at the nozzle can be regulated, and in which the nozzle at the point of use is provided with cooling means.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view of fuel apparatus constituting an embodiment of my invention; Fig. 2 is a longitudinal section of the device; Fig. 3 is a transverse section on the line 3—3 of Fig. 2; Fig. 4 is a side elevation showing the fuel nozzle; Fig. 5 is a perspective view showing the nozzle; and Fig. 6 is a cross-section of a rotary air-directing member located within the casing.

Before proceeding to a more detailed explanation of my invention it should be clearly understood that while the device is particularly intended for use with soft coal, fuels of other kinds can also be advantageously employed therein. I prefer to associate the fuel apparatus directly with a boiler or battery of boilers, the furnaces of which are designed for the use of a fuel mixture such as that provided by the apparatus. Needless to say, the device can be employed for other purposes than firing boilers. I have not shown an actuating mechanism for the apparatus, a steam turbine, an electric motor or any other suitable means being capable of employment for the purpose. Certain of the details of construction shown for example herewith, form no part of the invention and can be varied in accordance with individual preference and special conditions, without deviating from the essence of the invention as defined in the appended claims.

Referring more particularly to the drawings I employ a casing 10 mounted upon suitable supporting members 11 and comprising a lower semi-cylindrical section 12 and an upper, semi-cylindrical section 13. The cylindrical casing at the ends has heads 14, each of which is provided with a concentric bearing 15. In these bearings is journaled a shaft 16 projected at the end beyond the casing, and having at one end a pulley 17 or other suitable device for connecting it with a prime mover. At the other end, the shaft has a worm gear 18 which meshes with a gear wheel 19. The gear wheel 19 is mounted upon a shaft 20 journaled in suitable bearings 21 adjacent to the casing. The shaft has in addition, a bevel gear 22 in mesh with a bevel pinion 23 carried by a vertical governor shaft 24 with which are associated pivoted arms 25 carrying the customary governor weights 26, the governor being of the usual centrifugal type, and having a lateral arm 27 which moves upward and downward with the movement of the governor. The lateral arm 27 has pivotally associated therewith a link 28, in turn pivotally connected with a crank 29 mounted at the end of a rotatable valve stem 30. This stem extends through auxiliary air inlets 31 of the upper casing section, and is journaled in suitable openings of the walls of the inlets, which are of cylindrical form and are preferably screwed into the threaded openings in the door of the casing. Within each cylindrical inlet 31 the valve stem has a valve disk or plate 32 which serves to regulate the entrance of air into the casing through the inlets.

Mounted upon the shaft 16 within the casing, at the end thereof adjacent to the governor is a rotary air director comprising sides 33 between which are vanes 34. This device draws air in through opening 35 of the adjacent casing head and directs it radially inward, so that it can pass into the remainder of the casing, through a substantially central opening 36 of a partition 37. The inlet 36 has a laterally disposed flange 38 upon which the air directing member is journaled. Adjacent to the partition 37 the shaft 16 carries a spider having a hub 39 and arms or spokes 40, upon which are secured laterally disposed and extended blades 41 constituting paddles for a purpose which will appear hereinafter.

The upper casing section, adjacent to the paddle member, has a fuel inlet 42 in the form of a conduit having associated therewith a feed hopper 43. A shaft 44 is journaled within the conduit and has helical blades 45, so that in effect, it is a screw conveyer for advancing fuel from the hopper into the casing. The shaft extends beyond the conduit and has a stepped pulley 46 which is operatively connected by means of a belt 47 with a stepped pulley 48 at the end of the shaft 20, so that the screw conveyer can be driven from the shaft 20. The conduit 42 has associated therewith an electro-magnet 49 which serves to remove from the coal passing through the conduit, certain metallic impurities which are undesirable in the resulting fuel mixture. These impurities may be of different kinds but usually consist of particles of iron.

Between the ends thereof, the casing sections have annular extensions 50 which are enlargements and form within the casing annular grooves or recesses extending about it. A plurality of rotary crushing members, preferably three in number, is arranged within the casing, and each comprises a hub 51 rigidly mounted upon the shaft 16 and having arms 52, and at the ends of the arms a ring 53 which extends into one of the recesses 50 and has peripheral projections or serrations 54. At the side remote from the comminuting paddle each ring 53 is provided with radial grooves 55, forming ribs therebetween. In addition, the end rotary crushers have laterally disposed blades 55 at the adjacent faces, while the intermediate rotary crusher has similar, laterally disposed blades 56 at both sides. The rings 53 are of decreasing width from the governor end to the outlet end of the casing, so that the central openings through the rotary crushers increase correspondingly, as is clearly shown in Fig. 2.

Within the casing, at the end thereof remote from the governor is a rotary blower comprising a hub 57 rigidly secured upon the shaft 16, spokes 58, and the usual blades 59. The casing has an outlet 60 in the upper section thereof, at which is mounted a conduit 61, preferably in the form of a pipe of rounded cross section, which conducts the mixture of finely divided coal and air to a point of utilization.

The fuel nozzle I prefer to employ with my apparatus has a threaded neck 62 adapted to receive the correspondingly threaded end section of the conduit pipe 61. The nozzle beyond the neck is laterally extended and of tapering cross section, and is in effect wedge-shaped. It has a laterally disposed flange 63 adapted to seat at a correspondingly formed flange 64 of an inclined section 65, preferably located in a suitably formed opening of a furnace wall 66. The nozzle section or outlet 65 is downwardly disposed and has at the inner upper edge a downwardly curved lip 67, and at the inner lower edge a corresponding, curved lip 68. I have found that this form of nozzle outlet is particularly advantageous, in that it directs the fuel mixture into the furnace downwardly, upon the fuel bed. Adjacent to the outlet end of the nozzle I provide upwardly inclined air inlets 69, preferably extending across the entire width of the nozzle, and having a plurality, for example three, swinging gates 70 which can be opened and closed to regulate the amount of air entering with the fuel mixture. It is usually advisable to provide the nozzle section 65 with a water-jacket 71, for cooling purposes.

It will be seen that the air is drawn into the casing through the openings 35 and the auxiliary openings, passing from one end of the cylinder through the comminuting member, to the blower, and thence through the outlet for the fuel mixture. The passage of the air through the casing thus serves to draw with it, the finely divided particles of coal. The paddle member at the governor end of the device serves to break up the larger pieces of coal, and the other, successive comminuting members complete the process of sub-division. The air passes through the opening 36, substantially at the center of the casing and then gradually travels radially outward through the successively increasing openings within the rings 53. The coal is broken up by the action of the serrated edges of the comminuting members in the annular recesses of the casing, as well as by the action of the blades 41 and 55. The arms 52 of the comminuting members are staggered, as is shown in Fig. 3. This tends to cause the material to travel longitudinally of the casing, on the principle of the screw-conveyer.

As it can be seen from the drawing, the shaft 20, operating the governor, is provided with a step pulley 48 driving the feed mechanism 45, previously described, and it can be seen that when the speed of the shaft 16, which drives the shaft 20, is increased the speed of the shaft 20 is correspondingly increased and, consequently, the feed of coal into the apparatus will be correspondingly augmented, and the governor being accelerated by the increase of speed, will actuate the valve disks 32 and admit more air, so that the mixture will be correspondingly richer in fuel and air. It can be easily seen that by means of the step pulleys 48 and 46 the speed of the fuel supply to the apparatus may be varied for a given speed of rotation. The air director may be considered, also, as a blower which forces the air through the center orifice 36 concentric with the main shaft 16 and saturates the air so forced with the pulverized fuel and delivers the same to the other blower, which is positioned at the fuel outlet.

Having thus described my invention I claim as new, and desire to secure by Letters Patent:

1. An apparatus of the class described, comprising a casing having two independent compartments, a rotary comminuting device, and a blower in one of said compartments, said compartment having also a fuel inlet and a fuel outlet, and an air-directing member in the other of said compartments, said other compartment having an air inlet and an air outlet, said air outlet leading into said first-mentioned compartment.

2. Apparatus of the class described comprising, a casing having two independent compartments; one of the compartments having a fuel inlet and a fuel outlet; a blower adjacent the fuel outlet in said compartment; an air director in the second compartment co-acting with said blower; and rotary comminuting means in the first compartment intermediate the blower and the second compartment, said air director forcing the air centrally from the second compartment through said first compartment and said comminuting means therein, thereby saturating the air with the pulverized fuel, the blower receiving the air saturated with fuel and advancing the same to the fuel outlet.

3. An apparatus of the class described, comprising a casing having a shaft therein, a blower and an air director on said shaft, comminuting means on said shaft intermediate said blower and said air director, and located within said casing, a partition in said casing intermediate said air director and said comminuting means provided with an opening, means for driving said shaft, said casing having a fuel inlet and an outlet in the casing portion containing said comminuting device and said blower, an additional air inlet for admitting air to said air director, the said air inlet being independent through said auxiliary air inlet.

4. Apparatus of the class described comprising a casing having a shaft therein, a blower and an air director each mounted upon said shaft, comminuting means mounted upon said shaft, intermediate said blower and said air director, means for operating said shaft, said casing having a fuel inlet and an outlet, and having, furthermore, an auxiliary air inlet, a centrifugal governor controlled by said shaft, and means whereby said governor can control the flow of air through said auxiliary air inlet.

5. Apparatus of the class described, comprising a casing having a fuel inlet and an outlet, a rotary member at one end of said casing in front of said fuel inlet for drawing air into said casing and directing the same toward the axial, central portion thereof, a rotary comminuting device in said casing between said fuel inlet and said outlet through which the air is directed and, therefore, becomes mixed with the pulverized fuel, a blower in said casing at the end thereof remote from said rotary member first mentioned and receiving air mixed with the pulverized fuel and forcing same through the said fuel outlet.

6. Apparatus of the class described, comprising a casing having an axial shaft therein, means for driving said shaft, a blower upon said shaft, an air directing member upon said shaft, rotary comminuting means upon said shaft intermediate said blower and said air directing member, said air directing member forcing the air into said casing at the center thereof, said casing having a fuel inlet at one end in front of said air directing member and a fuel mixture outlet at the other end, said comminuting means comprising a plurality of rotating units having substantially central openings of different dimensions.

7. An apparatus of the class described, comprising a casing having two independent compartments, a blower and a rotary comminuting device in one of said compartments, an air director in the other of said compartments so that said comminuting device is intermediate the blower and the said air director, said first compartment having a fuel inlet adjacent said comminuting device and a fuel outlet adjacent said blower; said second compartment having an air inlet and an air outlet, said outlet being so disposed that the air forced by said air director passes centrally through said compartment containing the comminuting device and the blower, toward the blower.

8. An apparatus of the class described, comprising a casing having two independent compartments, a blower and a rotary comminuting device in one of said compartments, an air director in the other of said compartments, said comminuting device being intermediate the blower and said air director, each of said compartments having an independent inlet the first compartment for fuel, the second compartment for air, said compartments having communication independent of their inlets, and said compartment containing said comminuting device having an outlet through which the fuel and the air forced by the air director is made to pass.

9. Apparatus of the class described, comprising a casing having an axial shaft therein, means for driving said shaft, rotary comminuting means upon said shaft, a blower upon said shaft, an air-directing member upon said shaft, said member serving to direct air entering said casing, to the center thereof, said casing having a fuel inlet at one end, and a fuel mixture outlet at the other end, said comminuting means comprising a plurality of units having substantially central openings of different dimensions, said comminuting members having serrated edges and laterally disposed blades, said casing having at the blower end an outlet for the fuel mixture.

10. Apparatus of the class described, comprising a casing having an axial shaft therein, means for driving said shaft, rotary comminuting means upon said shaft, a blower upon said shaft, an air-directing member upon said shaft, said member serving to direct air entering said casing, to the center thereof, said casing having a fuel inlet at one end, a fuel mixture outlet at the other end, said comminuting means comprising a plurality of units having substantially central openings of different dimensions, said comminuting members having serrated edges and laterally disposed blades, said casing having at the blower end an outlet for the fuel mixture, said casing having an auxiliary air inlet, means for controlling the entrance of air through said inlet, and automatic governor mechanism operated by said shaft and controlling said last-mentioned means.

In testimony whereof I have signed my name to this specification in the presence of two subscribing witnesses.

JOHN HYDE.

Witnesses:
CLARENCE V. WATKINS,
HAROLD W. WATKINS.